United States Patent
Lytle

(10) Patent No.: US 7,556,277 B2
(45) Date of Patent: Jul. 7, 2009

(54) BICYCLE TRAINING AID WITH DYNAMICALLY DEPLOYABLE BALANCING FEATURES

(76) Inventor: Kimberly M. Lytle, 9525 Leemay St., Vienna, VA (US) 22182

( * ) Notice: Subject to any disclaimer, the term of this patent is extended or adjusted under 35 U.S.C. 154(b) by 378 days.

(21) Appl. No.: 11/499,745

(22) Filed: Aug. 7, 2006

(65) Prior Publication Data

US 2008/0029994 A1    Feb. 7, 2008

(51) Int. Cl.
*B62H 7/00* (2006.01)
(52) U.S. Cl. .................................. 280/301; 280/293
(58) Field of Classification Search ............... 280/293, 280/204, 301, 302, 303; 180/282
See application file for complete search history.

(56) References Cited

U.S. PATENT DOCUMENTS

| | | | | |
|---|---|---|---|---|
| 2,509,937 A * | 5/1950 | Olson | | 280/303 |
| 2,589,023 A * | 3/1952 | Pattner | | 280/301 |
| 3,362,726 A * | 1/1968 | Bell | | 280/303 |
| 3,877,727 A * | 4/1975 | Johannsen | | 280/301 |
| 4,181,190 A * | 1/1980 | Yang | | 180/219 |
| 4,810,000 A * | 3/1989 | Saunders | | 280/293 |
| 4,826,194 A * | 5/1989 | Sakita | | 285/302 |
| 5,054,803 A * | 10/1991 | Ellingsen, Jr. | | 280/301 |
| 5,064,213 A * | 11/1991 | Storch | | 280/301 |
| 5,338,204 A * | 8/1994 | Herndon | | 434/247 |
| 5,465,989 A * | 11/1995 | Grove | | 280/250 |
| 5,707,069 A * | 1/1998 | Plana | | 280/293 |
| 6,022,037 A * | 2/2000 | Code | | 280/303 |
| 6,237,930 B1 * | 5/2001 | Code | | 280/303 |
| 6,286,849 B1 * | 9/2001 | Slattery | | 280/301 |
| 6,360,838 B1 * | 3/2002 | Kulhavy | | 180/219 |
| 6,676,150 B1 | 1/2004 | Goldstein | | |
| 6,942,053 B2 * | 9/2005 | Hinton | | 180/209 |
| 7,314,225 B2 * | 1/2008 | Murnen et al. | | 280/217 |

* cited by examiner

*Primary Examiner*—Tony H. Winner

(57) ABSTRACT

A bicycle training aid has dynamically deployable balancing mechanisms that are used when teaching a child to ride a bicycle. The balancing mechanisms can be in the form of deployable training wheels that are actuated when the child becomes unstable on the bicycle. One mechanism for deploying the balancing mechanisms is a remote control, held by an adult supervisor, who can remotely deploy the balancing mechanisms when the adult observes that the child may be losing his or her balance. Alternatively, a pressure sensor may be used to sense when the child's foot comes off a pedal.

7 Claims, 7 Drawing Sheets

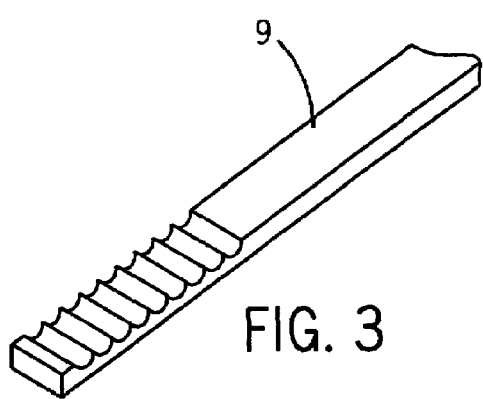
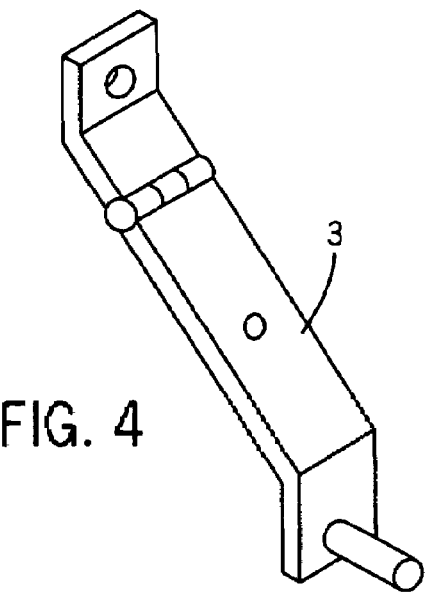
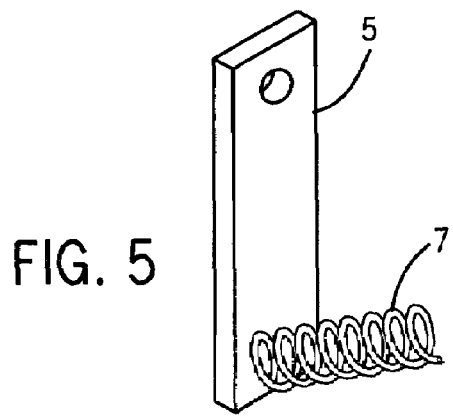
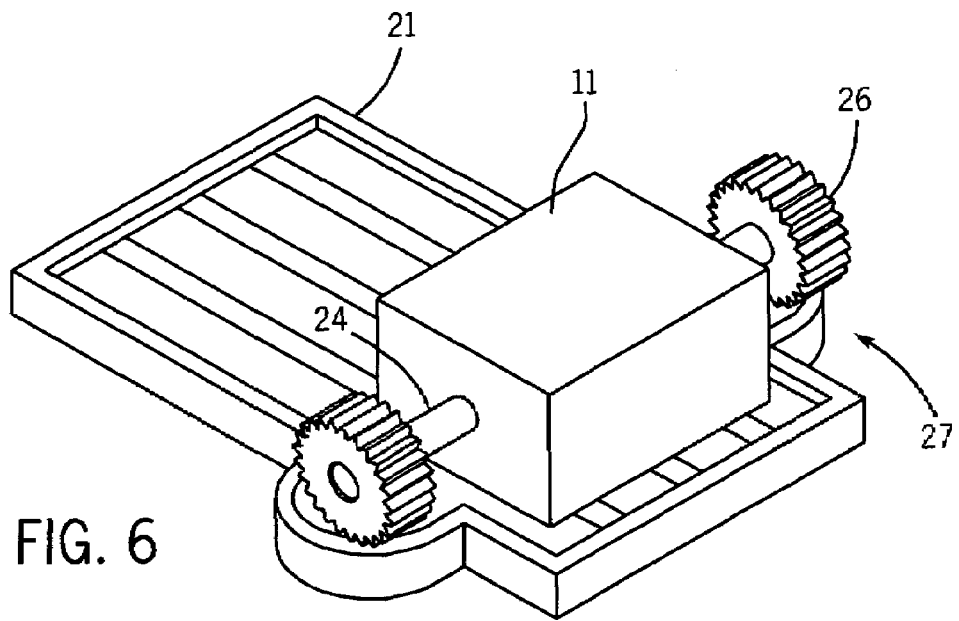

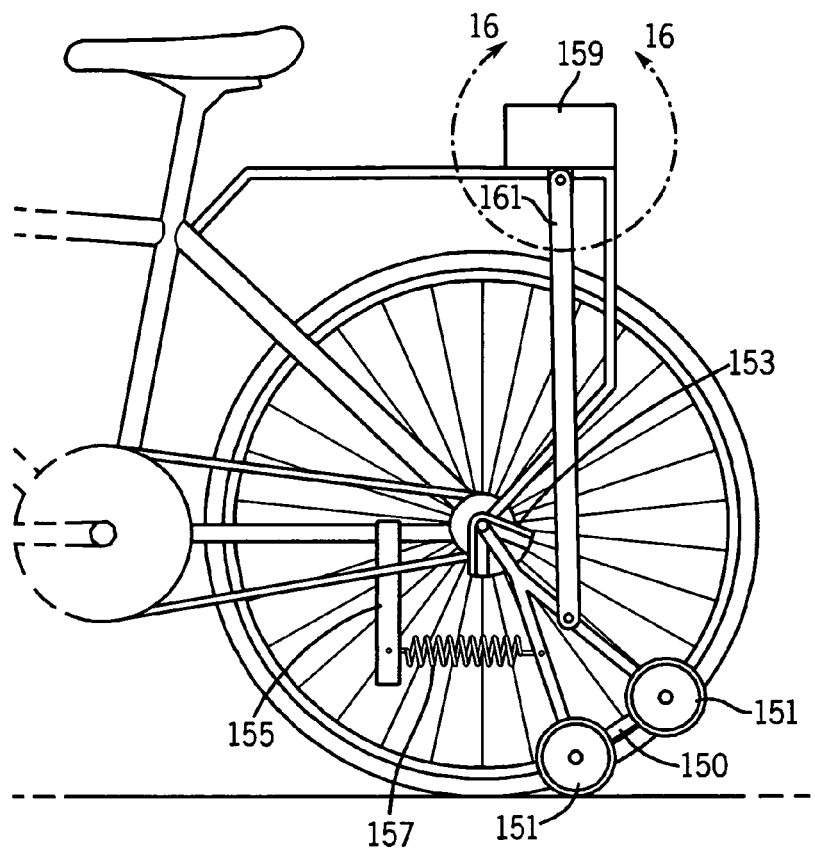
FIG. 15
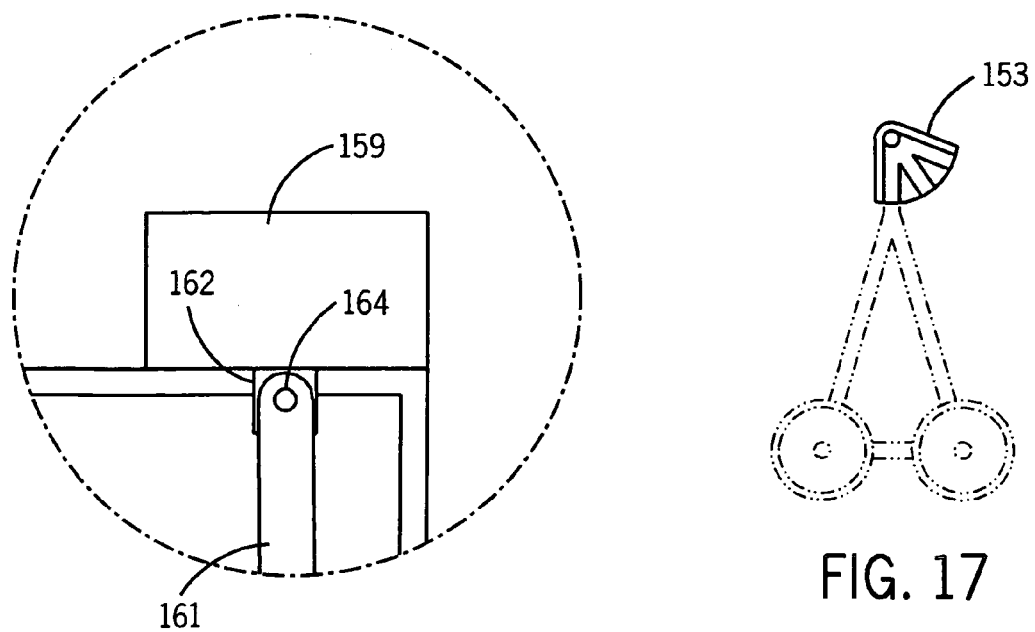
FIG. 16
FIG. 17

BICYCLE TRAINING AID WITH DYNAMICALLY DEPLOYABLE BALANCING FEATURES

BACKGROUND OF THE INVENTION

1. Field of the Invention

The present invention relates to mechanisms for assisting new bicycle riders. More particularly, the present invention relates to systems and apparatuses that serve as training aids to assist novice bicyclists learn how to balance when riding a bicycle.

2. Discussion of the Related Art

Learning how to ride a bicycle is easy for some children, but daunting for others. The real possibility of scrapping one's leg when falling down frightens many children, preventing them from effectively and quickly learning how to ride a bicycle. While conventional training wheels are often used by many, the training wheels become a crutch that the child relies on, thus limiting their progression in learning how to balance on the bicycle. In essence, training wheels serve as a proxy for a tricycle, or other self-balancing human-powered vehicle.

When transitioning from training wheels to a bicycle, the most common practice is for the child to attempt to keep his or her balance, while an adult runs behind the bicycle, holding the seat to maintain stability. There are a variety of conventional techniques to assist the child-adult team achieve their goal. U.S. Pat. No. 5,338,204 describes an apparatus with a handle disposed at the rear of the bicycle that is easily grasped by the adult when running behind the bicycle. The handle also actuates a set of deployable wheels such that once the child begins to gain enough speed, the adult can lift the wheels allowing the child to ride by his or herself.

Another mechanism, that does not require an adult to run behind the bicycle, is a set of compensating training wheels such as that described in U.S. Pat. No. 4,810,000. In this assembly, the training wheels are not rigidly attached to the bicycle, but rather can move up or down, based on the amount of tilt by the rider. Likewise, motorbike training devices are known to have similar features, such as that described in U.S. Pat. No. 6,237,930, which also provide an increased amount of resistance for a greater degree of turning.

Learning how to gain one's balance is an often difficult thing to do with a bicycle since the child has not yet developed a sense of balance without the assistance of the training wheels. Therefore, the child may be too timid to pedal the bicycle fast enough to generate sufficient gyroscopic force to help maintain his or her balance. U.S. Pat. No. 6,676,150 attempts to address this problem by providing a bicycle training apparatus that includes two flywheels powered by a motor. The two flywheels are disposed on opposite sides of the rear wheel of the bicycle and are actuated by hand controls that are suspended underneath of the bicycle's crossbar. When riding the bicycle, the operator reaches underneath the crossbar to actuate the flywheel mechanism.

SUMMARY OF THE INVENTION

The present invention has been made to address limitations with the above-identified and other prior art devices. In particular, the present inventor recognized deficiencies with the conventional bicycle training aids as discussed below. The bicycle balance training apparatus of U.S. Pat. No. 6,676,150, is a large, bulky apparatus that would make it even more difficult for a light-weight child to balance on the bicycle when the apparatus is not engaged. Furthermore, a child trying to learn how to use a bicycle has a difficult time simply steering the bicycle let alone having to operate controls that are suspended underneath of the crossbar. Also, a child who has not yet learned how to ride a bicycle is limited in their ability to appreciate how a bicycle will react under certain conditions. This is why many parents assist children in learning how to ride a bicycle by running behind the bicycle.

The compensation mechanisms of U.S. Pat. Nos. 4,810,000 and 6,237,930, provide positive feedback to the rider when the bicycle or motorcycle leans more than a desired amount. However, such a system will not give a child an accurate feel for how a bicycle would actually operate without the use of the training wheels.

Although U.S. Pat. No. 5,338,204 provides a mechanism by which a parent can remain actively involved in teaching a child to ride a bicycle, the apparatus requires a parent to run behind the bicycle in order to actuate the handle for deploying or retracting the balance wheels. The present inventor recognized that the prior art is generally deficient in providing a system that would allow a parent or grandparent to assist a child in learning how to ride a bicycle, without having to run behind the bicycle. Even a physically fit parent may become tired only after a short number of runs behind the bicycle.

The present invention addresses these and other limitations of conventional devices by providing a remote control capability, operated by the parent or grandparent. The remote control device held by the parent or grandparent transmits a signal to a device controller on the bicycle that selectively deploys or retracts stabilizing wheels. Moreover, in a starting position, the wheels would be deployed so that the bicycle is balanced by the wheels at a slow speed and then as the child gains speed and increased gyroscopic force assists the child in balancing, the parent or grandparent may actuate the retraction mechanism so the wheels are pulled away from the ground. However, if the parent or grandparent detects that the child is becoming unstable on the bicycle and may fall over, the parent or grandparent can remotely redeploy the wheels and prevent the child from crashing. Because the remote control transmission is done wirelessly, even a parent or grandparent who is not sufficiently fit to run behind the bicycle may nevertheless be able to assist their child or grandchild in learning how to ride a bicycle.

Optionally, the present invention may include sensors that detect whether the child is becoming unstable on the bicycle. As an example, the sensor may detect the child's foot slipping off of the pedal, or determine that the angle of the bicycle has exceeded a threshold angle, indicating that the child and the bicycle may soon tip over. Likewise, the sensor may include a speed sensor so the wheels are deployed only at slow speeds where the gyroscopic force is relatively low, and then retracted at higher speeds where the bicycle is more stable and unlikely to tip over.

The invention optionally includes a mechanism for a human-powered flywheel to initially produce a gyroscopic force before the child begins to ride the bicycle at a slow speed.

An advantage of the present invention is that it allows adult supervision for a child learning how to ride a bicycle without the requirement for the parent or grandparent to ride or run behind the bicycle. Furthermore, the training mechanism allows the child more repetitions than would otherwise occur if the parent or grandparent attempted to run behind the bicycle without resting in between intervals. Also, for the especially timid rider, having the deployable wheels allows the child to experience a sense of accomplishment without being paralyzed by fear of falling.

BRIEF DESCRIPTION OF THE DRAWINGS

FIG. 3 is a more detailed drawing of an action member shown in FIGS. 1 and 2;

FIG. 4 is a more detailed drawing of a deployable support shown in FIGS. 1 and 2;

FIG. 5 is a more detailed drawing of a member used to support a retraction mechanism for the deployable wheels shown in FIGS. 1 and 2;

FIG. 6 is a perspective view of a top portion of the remote control training aid, including a controller;

FIG. 15 is a side view of a remote control aid according to another embodiment of the present invention that uses an integral frame;

FIG. 16 is a more detailed illustration of a connection between an actuator and rod of FIG. 15;

FIG. 17 is a side view of a three-position flange that receives the integral frame at one of three positions.

DETAILED DESCRIPTION OF THE INVENTION

Figure 1:
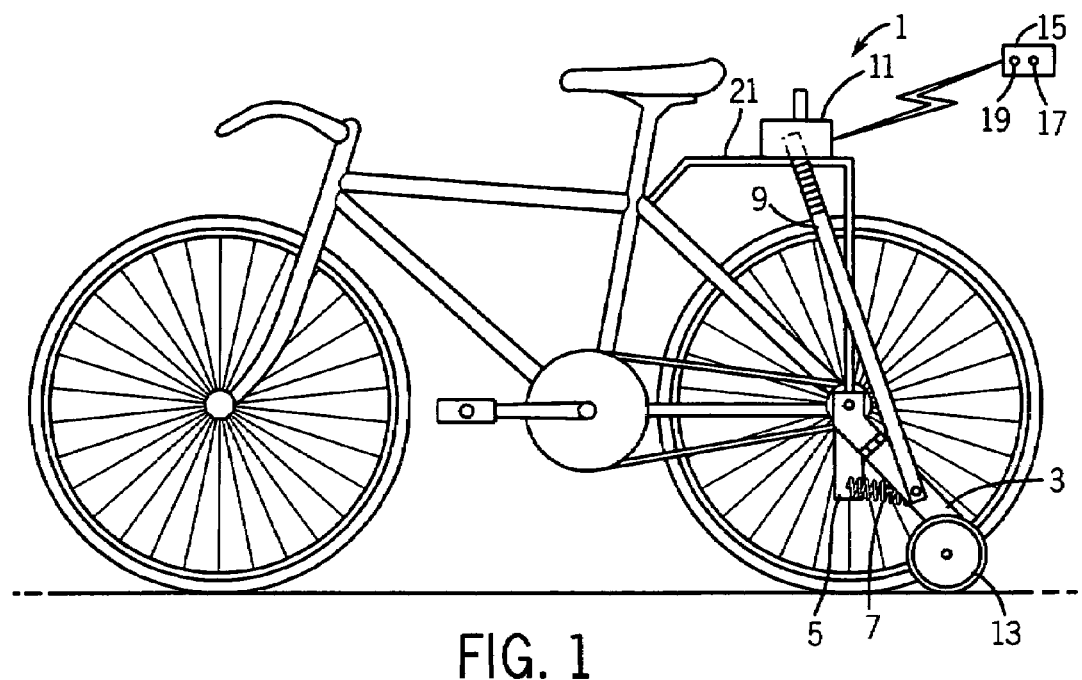
FIG. 1 is a side view of an apparatus for bicycle riding instruction according to one aspect of the present invention.

FIG. 1 shows a remote controlled training aid 1 according to one embodiment of the present invention. The remote controlled training aid 1 is mountable to the frame and hub of a typical bicycle, and includes a deployable support 3 having a wheel 13 at an end thereof. A similar support 3 is on the other side of the bicycle. The deployable support 3 is shown in more detail in FIG. 4, as will be discussed. The deployable support 3 attaches to the middle portion of the rear wheel of the bicycle as shown. A member 5 is attached at one end thereof to the hub (or axel bolt) of the rear wheel. The other end of the member 5 has a resilient device with a spring force (such as spring 7 or other elastic member, or motor driven device). The spring 7 attaches at one end to the member 5 and at the other end to the deployable support 3 so as to urge the deployable support 3 toward the ground, such that the wheel 13 will remain in contact with the ground if no other force is applied to the deployable support.

Connected to the deployable support 3 is an action member 9 that extends up to a controller 11, which is mounted on a rack 21. The action member 9 is movable in a generally upward direction, away from the ground, when driven by the controller 11. The action member 9 pulls the deployable support 3 so as to lift the wheel 13 from the ground.

Retracting or deploying the remote controlled training aid 1 is initiated via wireless signals sent from a remote control 15. The wheels 13 (which are on both sides of the bicycle) are normally in a down position (wheels contacting the ground) when the bicycle is stopped or the bicycle is pedaled at a slow speed. An adult supervising the child holds the remote control device 15, and when the adult believes the child is going sufficiently fast to maintain his or her balance, pushes the "up" button 19, which in turn generates a signal that is transmitted to the controller 11 to retract the wheels 13. If during the course of the child's pedaling, the adult believes the child is in need of further assistance, the adult pushes the down button 17, which sends a signal to the controller 11 to cause the action member 9 to quickly move down towards the ground, assisted by the resilient force of the spring 7. In this way, the wheels quickly retract and help stabilize the bicycle before the child falls over. The speed of retraction and deployment is optionally set by a driving speed of controller 11, spring force of the spring 7, and gearing ratio of the action member and controller 11.

Figure 2:
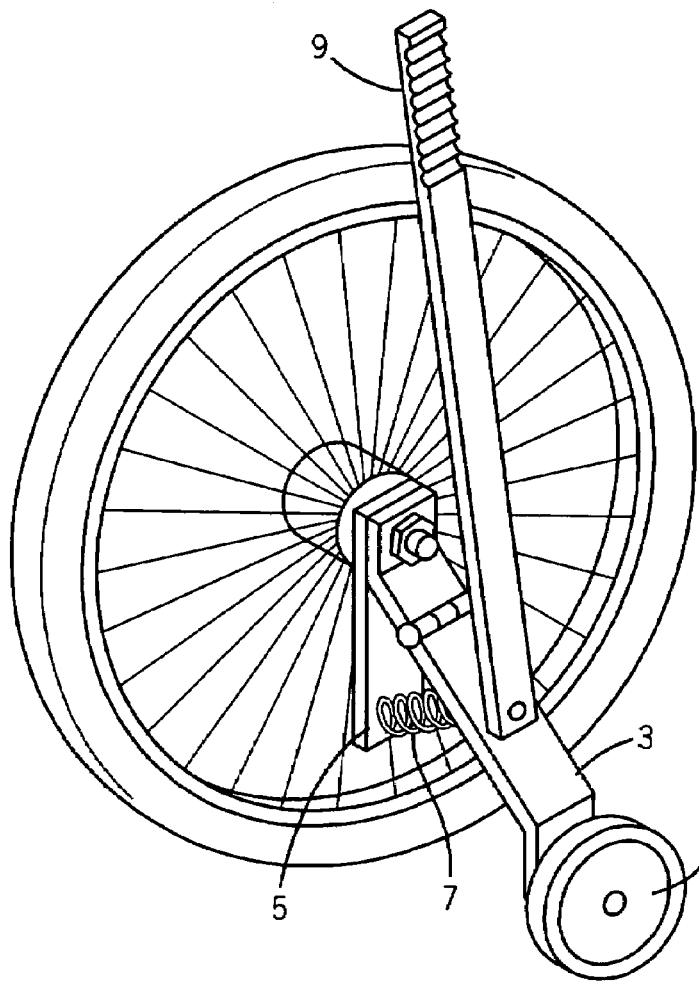
FIG. 2 is a perspective view of a lower portion of the remote control training aid of FIG. 1.

FIG. 2 shows in more detail the connection between the action member 9 and the deployable support 3. The action member 9 pivotally attaches to the support 3 (or attached other suitable attachment means, such as an elastic connection) so that when the action member 9 is drawn in an upward direction, the deployable support 3 is drawn upwards as well. When the deployable support 3 is drawn upwards, the spring 7 lengthens, and exerts an increasingly large downward force so as to bias the deployable support 3 in a downward direction. However, the force exerted by the controller 11 exceeds that of the spring force in a downward direction so the wheels retract from the ground. However, once the upward force exerted by the controller is removed, the spring force from the spring 7 pulls the wheels 13 back to the ground to stabilize the bicycle. The amount by which the wheels are elevated is a function of how long the adult presses the "up" button on the transmitter, and a set-stop, which limits the elevation of the wheels to a set distance, such as 2" above the ground.

FIG. 3 shows an upper end portion of the action member 9, having grooves formed therein that are received by a gear (or geared wheel) driven by the controller 11. The grooves receive the gear's teeth, and when the gear is driven, the upper end portion of the action member 9 moves in a generally upward direction when the controller 11 turns the gear.

FIG. 4 shows the deployable support 3 having a hinge formed therein, which allows for the deployable support 3 to move in an upward direction and be pulled back down towards the ground, depending on whether the force from the controller exceeds that of the spring force exerted by the spring 7. The other side of the hinge, namely the side that attaches to the bicycle, remains fixed.

FIG. 5 illustrates the member 5, to which the spring 7 connects.

FIG. 6 shows the arrangement of the controller 11, mounted on a rack 21. The rack 21 is shown in greater detail in FIG. 7 and the electronics portion of the controller 11 is shown in more detail in FIG. 8. The controller 11 includes a motor 84 (FIG. 8) that drives a shaft 24, which in turn controllably turns geared wheels 26. The geared wheels 26 are configured to engage with the grooves in the action member 9 as previously discussed. The rack 21 includes U portions 27 through which the action members are positioned. The U portions serve to maintain contact between the geared wheels 26 and the grooved portions of the action member 9.

Figure 7:
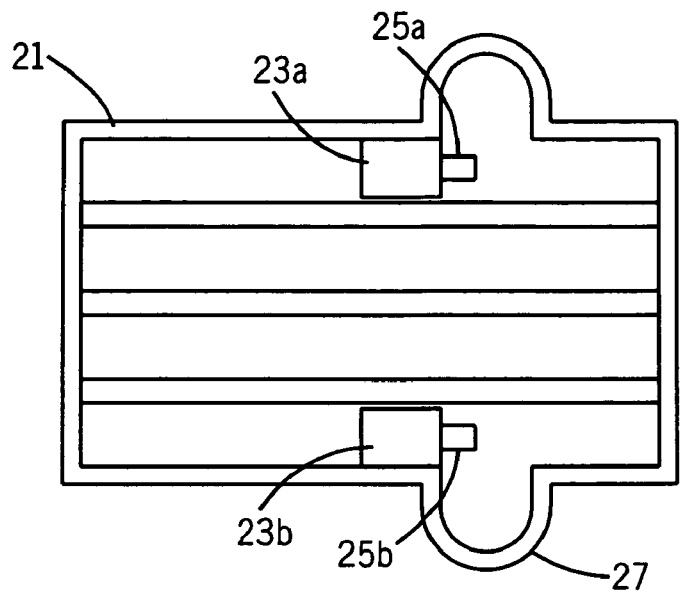
FIG. 7 is a perspective view of a rack including actuators that coordinate with the controller of FIG. 6.

FIG. 7 is a more detailed drawing of the rack 21 that is mounted on the back portion of the bicycle over top of the rear wheel. The rack includes two actuators 23a and 23b that respectively drive plungers 25a and 25b. The plungers are normally in a retracted position so the grooves of the action member 9 remain engaged with the geared wheels 26. However, when the down button of the remote control 21 (FIG. 1) is pressed, a wireless signal is sent to the controller 11, which causes the controller 11 to drive the actuators 23a and 23b to deploy the plungers 25a and 25b and push the action member 9 off of the geared wheels 26 so the spring force the spring 7 quickly pulls the action member 9 in a downward direction to deploy the wheels 13. After a predetermined period of time, such as 1 second (although any other suitable time such as 2 second through 10 seconds), the controller 11 causes the actuators 23a an 23b to withdraw the plungers 25a and 25b so that the grooves of the action member 9 engage again with geared wheels 26.

Figure 8:
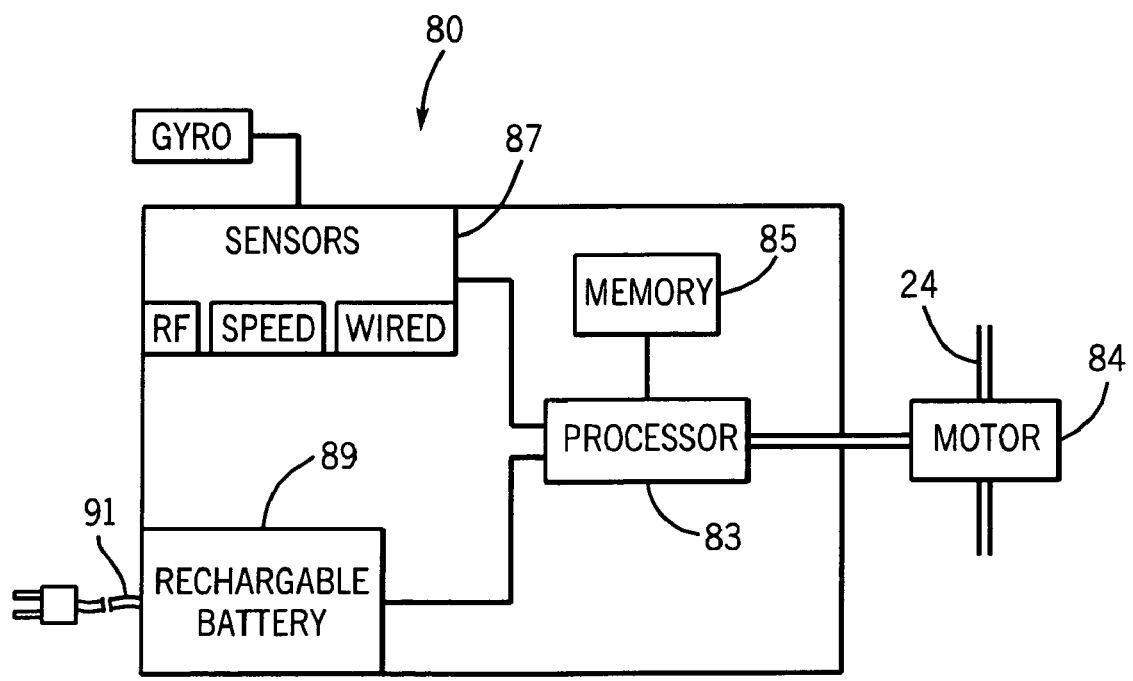
FIG. 8 is a block diagram of electrical components used in the controller 11.

FIG. 8 shows an electronic portion 80 of the controller 11. In this embodiment the electronics portion 80 is based on a processor 83 executing software, although alternative constructions may be used such as the use of application specific integrated circuits, special discrete logic, field programmable logic array, or other suitable firmware or hardware implementations. The processor 83 connects to memory 85, which contains the software instructions for processing signals from the respective sensors 87, and for actuating the motor 84 and actuators 23a and 23b (FIG. 7). The sensors 87 include at least a wireless sensor used to receive the wireless transmissions from the remote control 15. A radio frequency (RF) receiver may be used, as well as other wavelengths such as infrared. The frequencies used by the remote control device 15 need not be specific, but rather may overlap with those used for conventional remote control vehicles, ultra wide band transmissions or even wireless LAN transmissions.

The sensors also include a speed sensor, an optional feature used by the processor 83 for automatically retracting the wheels when the bicycle reaches a predetermined speed such as 5 mph. In this case, the remote control 15 is used as a backup safety measure. A gyro is optionally included for use by the processor 83 in determining a rate of change of bicycle tilt so as to cause the processor to redeploy the wheels if it is determined that the rate of change of tilt (such as greater than 15° per 50 milliseconds) indicates that the child is tipping over on the bicycle. The sensor 87 may also include a wired sensor, for receiving signals from pressure sensors like that shown in FIG. 10 for detecting whether the child's foot slips off of the pedal. Pressure sensor 103 is fixed to, or built into the pedal 100. A wire from the sensor extends up the pedal arm and connects to another wire on the bicycle frame via a rotatable brush contact. A wireless radio frequency (RF) communication channel could also be used, since it is not limited to "line of sight" communications, and the path between the pedal and receiver may be blocked.

The processor 83 receives the respective sensor inputs and reacts by deploying or retracting the wheels according to the predetermined events.

Power for the electronics portion 80 and for the motor 84 is provided by rechargeable battery 89 that includes an A/C adapter circuit 91 for converting A/C to D/C for recharging the battery when plugged in. The motor 84 drives shaft 24 under control of the processor, and as provided power by the rechargeable battery 89. Electrical energy may also be provided by a generator driven by the rotation of the bicycle tires, and/or chain sprocket.

Second Embodiment

Figure 11:
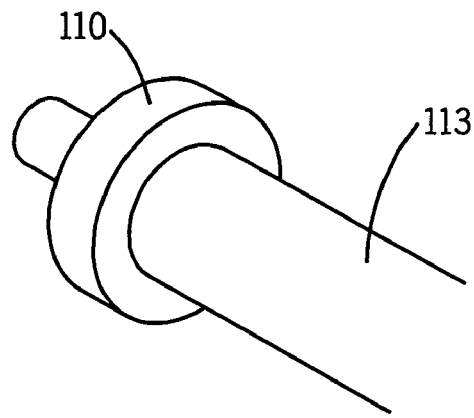
FIG. 11 is a perspective view of a flywheel assembly according to another embodiment of the present invention.
Figure 12:
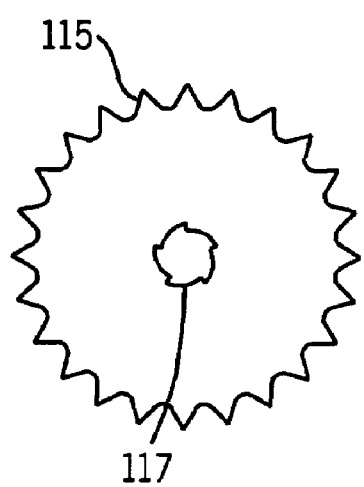
FIG. 12 is a side view of the flywheel of FIG. 11.
Figure 13A:
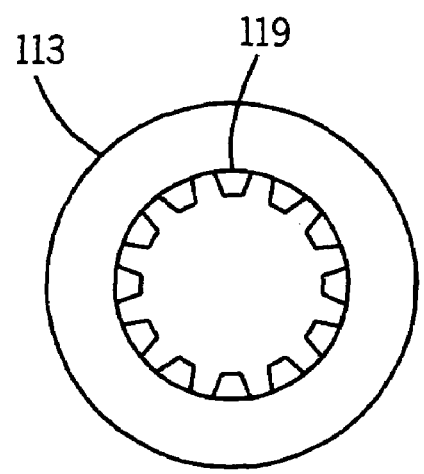
FIGS. 13A and 13B show a coaxial drive shaft for driving the flywheel.
Figure 13B:
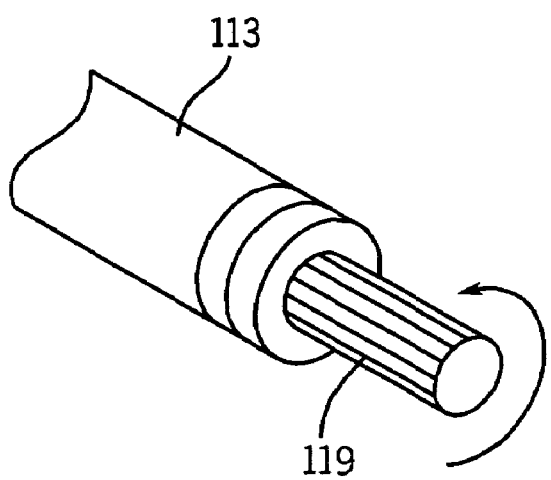
Figure 14:
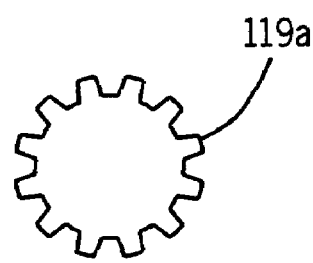
FIG. 14 is end view of the drive shaft, showing the drive shaft teeth.

FIG. 11 shows a flywheel assembly that attaches to the rear wheel hub 110 by way of a coaxial drive shaft 113. The outer portion of the coaxial drive shaft (see e.g. FIGS. 13A and 13B) remain fixed so that a nut may be placed on threaded ends thereof for holding the rear wheel in place. Within the coaxial drive shaft 113, a rotating drive shaft 119 rotates with the rear wheel. This drive shaft engages one-way drive teeth on an inner rim 117 of the flywheel 115. The outer portion of the drive shaft 119 includes teeth 119a (see FIG. 14) that engage the one-way drive teeth 117 on the inner rim of the flywheel.

The one-way drive teeth 117 of the flywheel are made to engage the drive shaft teeth 119a such that when the drive chain of the bicycle is used to drive the rear wheel, some of the power from the drive chain is transmitted to the drive shaft 119 for spinning the flywheel 115. As the child pedals faster, the rate of spinning of the flywheel increases, thereby increasing the centripetal force and gyroscopic force to help stabilize the bicycle. When the rear wheel is not being driven by the chain on the bicycle, the one-way drive teeth 117 are configured to slide over top of the drive shaft teeth 119a so that the flywheel continues to spin even though the rear wheel is no longer being driven by the chain.

In operation, the rear wheel of the bicycle is held in the air by a support stand (see FIG. 15) and the child may begin to pedal the bicycle without moving because the rear wheel of the bicycle (the driven wheel) is being held by the stand. The driving action is conveyed by the chain on the bicycle and drives the flywheel to begin spinning in clockwise direction. Once enough kinetic energy is imparted to the flywheel, the child may retract the stand and enjoy the beneficial effect of increased stability owed to the spinning of the flywheel. When coasting, the one-way drive teeth on the inner rim 117 of the flywheel slide over top of the drive shaft teeth 119a on the drive shaft 119 so the fly wheel will continue to spin despite the bicycle slowing down, or even stopping. Also, if the flywheel is spinning faster than the child is pedaling, the child will not experience resistance from the flywheel because the flywheel will still be sliding over the one-way drive teeth.

Figure 9:
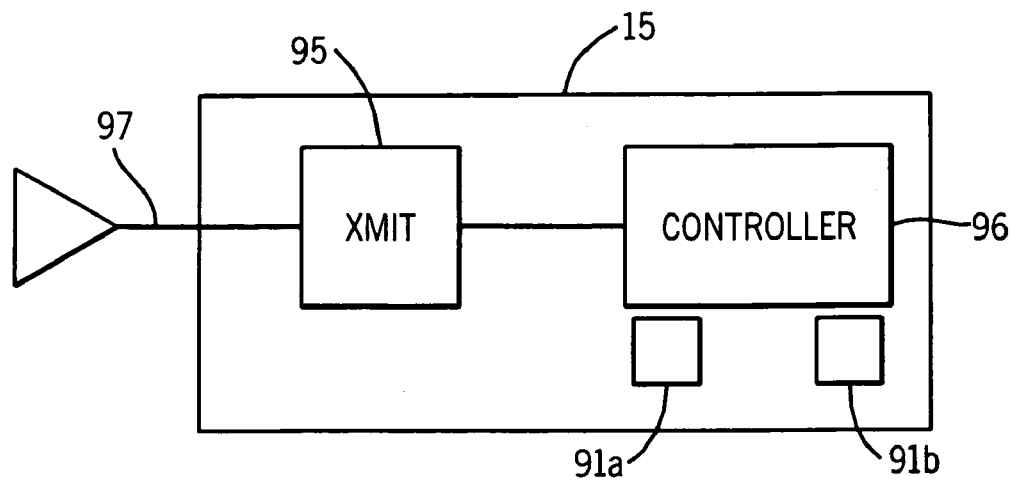
FIG. 9 is a block diagram of the remote control device used for sending wireless signals to the remote control training aid of FIG. 1.

FIG. 9 shows a block diagram of the components in the remote control device 15. Sensors 91a and 91b sense when buttons 17 and 19 (FIG. 1) are depressed on the remote control device 15. The respective signals are then sent to a transmitter 95 via controller 96 which transmit through an antenna (or if it is an optical transmission such as infrared, to a light source) through antenna 97. The transmitter generates a first wireless signal when the up button 19 is pushed, and a second signal when the down button is pushed. The signals are received by the sensors 87 in the electronics 80 of the controller 11 (see e.g. FIG. 8).

Figure 10:
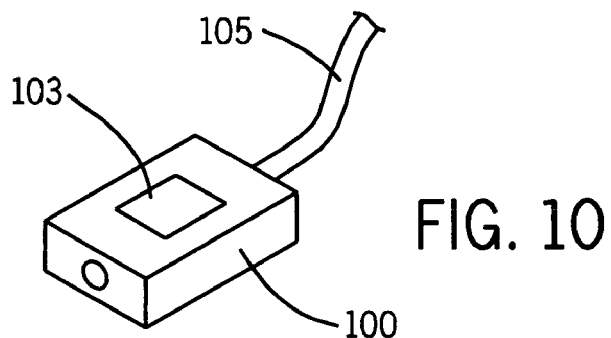
FIG. 10 is a perspective view of a pedal assembly that includes a pressure sensor used to detect whether a child's foot is on the pedal.

FIG. 10 shows a pedal 100 that has a pressure sensor 103 set thereon. The pressure sensor 103 normally generates a signal when the pressure sensor 103 senses a pressure applied thereto. The pressure sensor 103 sends a signal either wired or wireless to the controller 11 so that the controller 11 can deploy or not deploy the wheels 13 based on whether a pressure is sensed on the pedal 100.

FIG. 15 shows another embodiment of the present invention. In this embodiment, an integral frame 150 is equipped with wheels 151 at the corners of its triangular structure. At the third corner of the triangular structure, the integral frame attaches to the fixed hub of the rear wheel by way of a three-position flange 153. The respective segments of the integral frame 150 are cylindrical such that the curved portions of the legs of the frame are held at each of the three grooved portions in the three-position flange 153 (FIG. 17). In the lowest of the three flange portions, the integral frame 150 holds the rear wheel above the ground so that the rear wheel does not make contact with the ground, thus allowing the child to pedal and "spin-up" the fly wheel. In the middle position, the rear wheels contact the ground and provide a stabilizing force (like a kickstand, or outriggers) so as to stabilize the child on the bicycle. In the third position, the wheels 151 are raised to an elevated position such that the wheels do not provide a stabilizing force to the child on the bicycle.

A support 155, attached to the frame of the bicycle, is used to anchor a spring 157 (or other device that exerts a resilient force) so as to urge the integral frame 150 toward the front of the bicycle. Attached to one leg of the integral frame 150 is a rod 161, that is driven by the actuator 159. The actuator 159 when in an extended portion, positions the integral frame 150 in the center portion of the three-position flange. When the actuator 159 withdraws the plunger 162, the actuator 159 pulls the integral frame 150 into the upper position on the three-position flange 153. Optionally, the actuator 159 has three stable positions for the plunger 162, where the third position forces the integral frame 150 to be positioned in the lowest position (where the wheel is suspended above the ground).

FIG. 16 shows a more detailed diagram of the connection between the actuator 159 and plunger 162, connector 164, which is received in a hole made in rod 161. In one embodiment, when the integral frame 150 is positioned in the lowest portion of the three-positioned flange, the rod 161 may be removed from the connector 164 so the actuator need only be a two-position actuator (one position forcing the integral frame to an upper-most position, and a second position with the plunger extended to force the integral frame to have the wheels contact the ground).

FIG. 17 is a more detailed diagram showing the three-positioned flange 153 used to receive the integral frame 150 in one of the three grooved portions therein.

Figure 18:
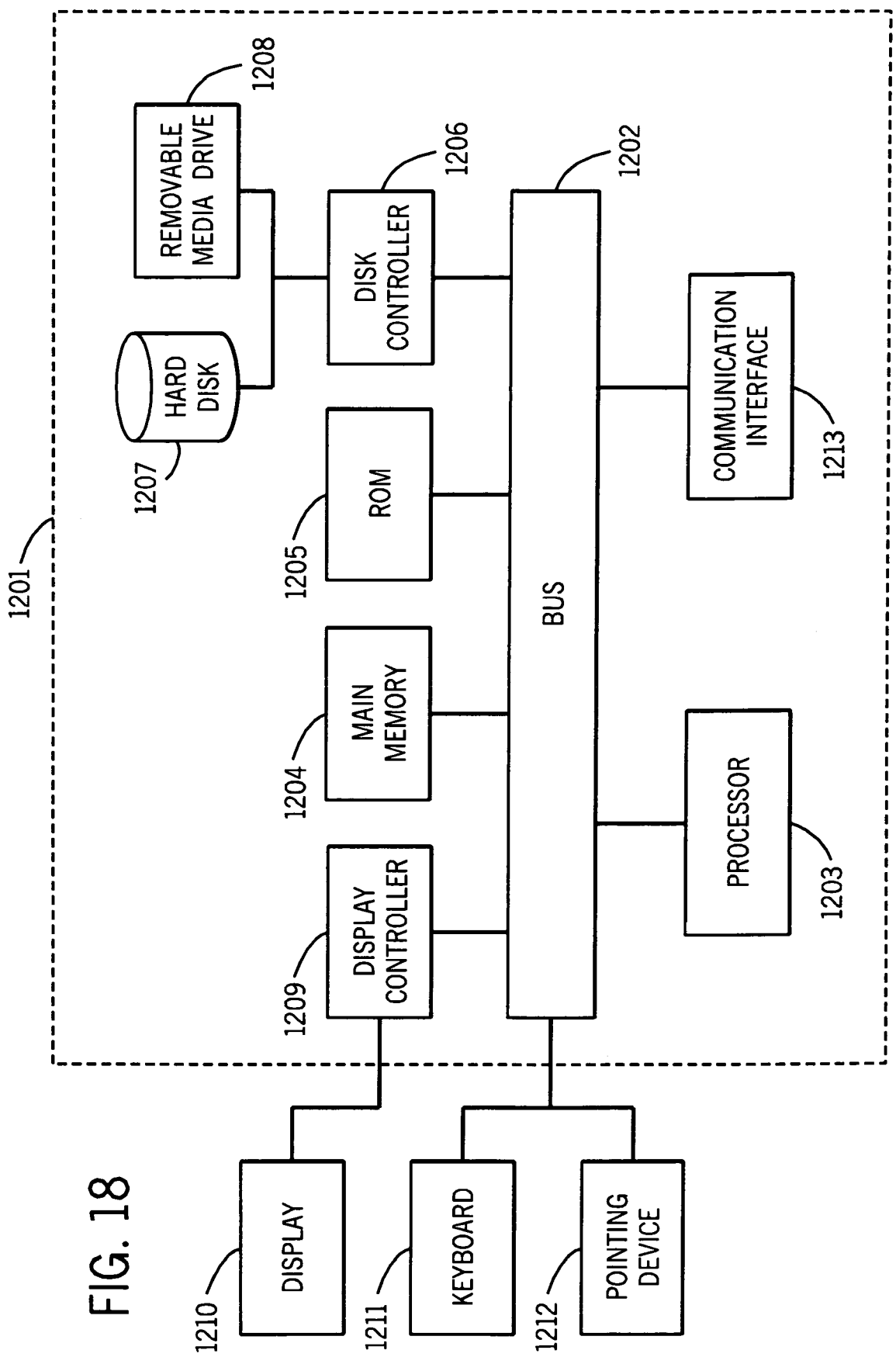
FIG. 18 is a block diagram of an exemplary processing portion of the controller of FIG. 8.

FIG. 18 illustrates a computer system 1201 upon which an embodiment of the present invention may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user when being programmed. The computer system is able to attach to input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

While the present description is provided the main teachings of the present invention, it will be appreciated by one of ordinary skill in the art that the inventions is not limited to these specific embodiments, but also provide adequate support for equivalent structures and methods for accomplishing the same objectives.

The invention claimed is:

1. A bicycle training aid comprising:
   a deployable support configured to be attached at one end thereof to a bicycle and having a wheel disposed at the other end;
   an action member attached at one end thereof to the deployable support, and configured to engage a driving mechanism at the other end;
   the driving mechanism configured to exert a directional force on said action member; a wireless transmitter configured to transmit a control signal in response to a user-actuated input; and
   a receiver configured to receive the control signal and produce an electrical signal that actuates the driving mechanism, wherein
   when said directional force from said driving mechanism is applied to the action member, said action member exerts a corresponding force on said deployable support to retract said wheel from the ground.

2. The bicycle training aid of claim 1, further comprising:
   an actuator that is controllably actuated to disengage said action member from said driving mechanism, and a resilient member biased to move the deployable support and the wheel to contact ground in response to said action member being disengaged from said driving mechanism, wherein
   said wireless transmitter is configured to transmit a second control signal, and
   said receiver is configured to receive the second control signal and produce another electrical signal that controls the actuator.

3. The bicycle training aid of claim 1, wherein:
   the end of the action member that engages the driving mechanism includes teeth, and
   said driving mechanism includes an electric motor and other teeth that engage the teeth of the action member.

4. The bicycle training aid of claim 1, further comprising:
   an orientation sensor that produces an orientation signal corresponding to tilt angle of the bicycle relative to a predetermined orientation; and
   a controller configured to compare the signal from the orientation signal against a predetermined level and actuate the reset mechanism when the orientation signal at least one of matches and surpasses said predetermined level.

5. The bicycle training aid of claim 1, further comprising:
   a sensor mounted on a pedal of said bicycle and configured to produce a reset signal when a foot of a bicycle rider is removed from said pedal, said reset signal causing said reset mechanism to exert said releasing force.

6. The bicycle training aid of claim 1, wherein:
   said wireless transmitter is configured to transmit another control signal that when received by said receiver causes said driving mechanism to exert an opposite directional force on said action member and return said wheel to the ground.

7. A bicycle training aid comprising:
   a deployable support configured to be attached at one end thereof to a bicycle and having a wheel disposed at the other end;
   first means for moving the deployable support from a first position where the wheel of the deployable support is contact with ground to the second position where the wheel of the deployable support does not contact ground;
   second means for moving the deployable support from the second position to the first position;
   a wireless transmitter configured to transmit at least one of a first control signal and a second control signal in response to a user-actuated input; and
   a receiver configured to produce an electrical signal in response to receiving the first control signal to actuate the first means for moving, and configured to produce another electrical signal in response to receiving the second control signal to actuate the second means for moving.

* * * * *